United States Patent [19]

Kiefer et al.

[11] 3,875,462
[45] Apr. 1, 1975

[54] FOOD WASTE DISPOSER

[75] Inventors: George E. Kiefer; Lauren W. Guth, both of Louisville, Ky.

[73] Assignee: General Electric Company, Louisville, Ky.

[22] Filed: Feb. 1, 1973

[21] Appl. No.: 328,683

[52] U.S. Cl................ 317/13 R, 310/43, 310/68 C, 317/13 B, 241/46 A, 241/257 G, 241/285 A
[51] Int. Cl...................... H02h 7/08, H02h 7/085
[58] Field of Search....... 241/31, 46 A, 46 B, 46.17, 241/257 G, 101.5, 285 A, 285 B, 299; 310/43, 90, 157, 68 C, 68 R, 68 B, 68 A; 317/13 R, 13 B, 13 C, 13 D, 40 R; 337/348

[56] References Cited
UNITED STATES PATENTS

| | | |
|---|---|---|
| 2,066,904 | 1/1937 | Bartmess............................ 317/40 R |
| 2,473,485 | 6/1949 | Vickers............................. 310/68 C |
| 2,850,244 | 9/1958 | James et al...................... 241/257 G |
| 3,010,401 | 11/1961 | Granqvist........................ 310/68 C |
| 3,159,354 | 12/1964 | Yartz et al............................ 310/90 |
| 3,163,369 | 12/1964 | Hogue................................... 310/43 |

Primary Examiner—J. D. Miller
Assistant Examiner—Patrick R. Salce

[57] ABSTRACT

There is disclosed a food waste disposer having a combined overload switch mounting and ground plate. The plate is fastened directly to the bottom of the stator housing. The mounting plate allows recessing of the overload reset switch button, provides a direct heat conductive path from the motor bearing toward the overload switch, facilitates assembly of the disposer, provides a cap which prevents lubricant loss from the lower motor bearing, and provides an electrical ground connection to the lower motor bearing.

7 Claims, 3 Drawing Figures

3,875,462

FOOD WASTE DISPOSER

BACKGROUND OF THE INVENTION

Food waste disposers are, of course, in wide use. In one commercially available disposer made by the assignee of this invention, known as Model FC100L, there is provided a stator cast into a housing of non-magnetic material such as a suitable epoxy resin. The housing carries a vertically aligned bearing element in which the lower rotor shaft rotates. The lower rotor bearing is exposed to a compartment carrying a temperature responsive switch for de-energizing the motor, in a situation such as when the disposer is running in a motor overload or excessive temperature condition. A disclosure of disposers of this general type is found in U.S. Pat. No. 3,159,354.

Although disposers of this type have enjoyed wide acceptance, certain improvements therein are contemplated by this invention. More particularly, the switch mounting and ground plate of this invention provides a more efficient heat transfer path between the lower rotor bearing and a temperature responsive switch thereby de-energizing the disposer in a more reliable, predictable manner when a detrimental change in operating condition occurs. The mounting and ground plate also provides a cap closing off the lower rotor bearing thereby minimizing loss of lubricant therefrom. The practice of this invention also allows recessing of the reset button inside the disposer motor cover thus preventing inadvertently holding the reset button in the switch closed position. The practice of this invention also allows more rapid and less troublesome installation of the disposer cover or outer housing shell. These and other advantages of the invention will become more fully apparent as the description proceeds.

SUMMARY OF THE INVENTION

It is an object of this invention to provide an improved food waste disposer incorporating a combined overload switch mounting and ground plate which provides for more efficient operation and which allows more efficient assembly.

In summary, this invention comprises an electrically energized food waste disposer comprising an electrically nonconductive stator housing, a rotor bearing carried by the housing, a thermally and electrically conductive member affixed to the housing in thermal and electrical contact with the bearing, a thermally responsive switch carried by the member in heat exchanging relation thereto for de-energizing the disposer in response to increasing bearing temperature, a cover affixed to the housing for enclosing the switch and member and including an electrical terminal, and means grounding the member to the terminal.

DETAILED DESCRIPTION OF THE PREFERRED EMBODIMENT

Figure 1:
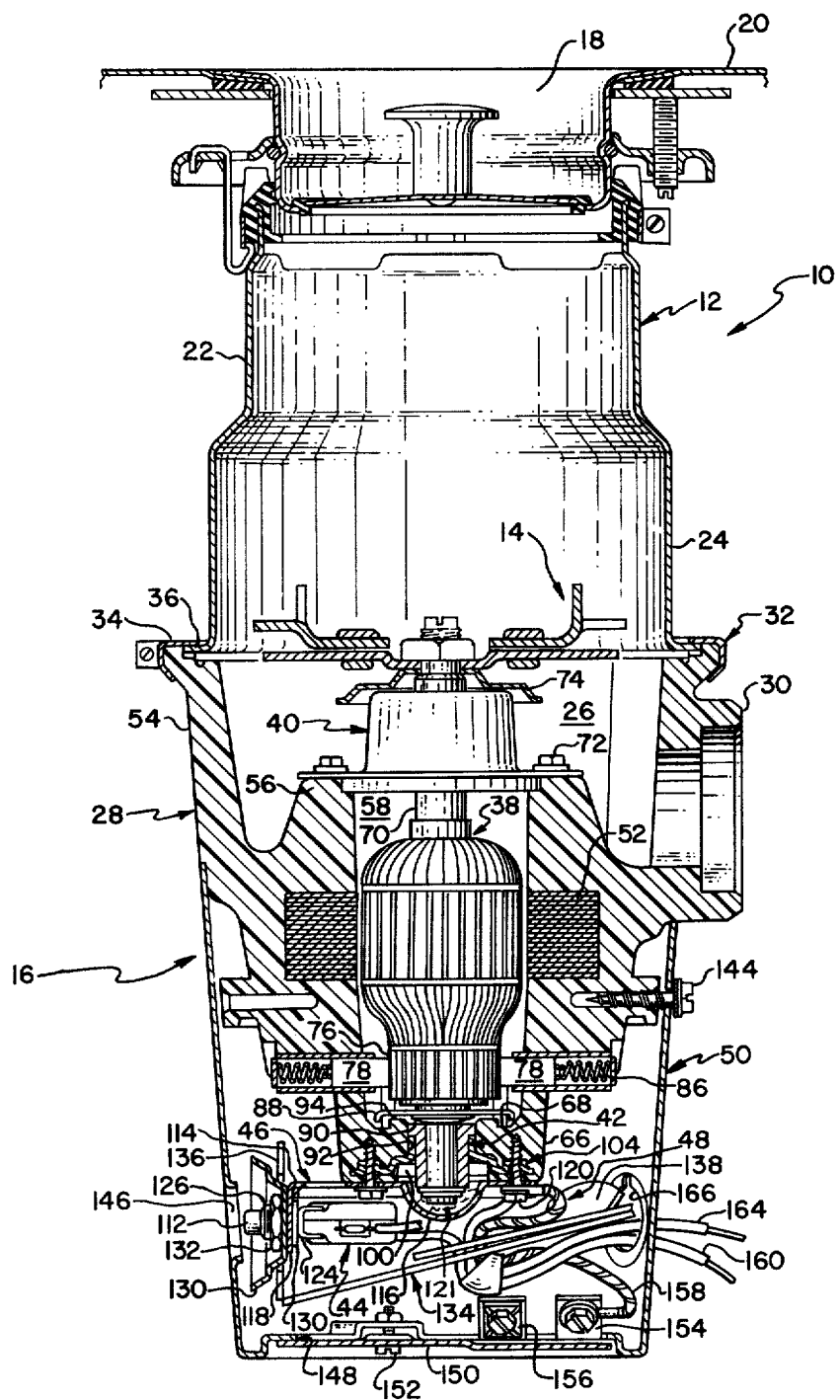
FIG. 1 is a vertical cross-sectional view of a food waste disposer incorporating the principles of this invention.

Referring to FIG. 1, there is illustrated a food waste disposer 10 comprising as major components a generally cylindrical hopper 12, a rotatable comminutor 14 located adjacent the bottom of the hopper 12 and a vertically disposed motor assembly 16 in which the present invention is incorporated. The upper end of the hopper 12 is designed to be suspended from the drain opening or sink flange 18 of a typical kitchen sink 20. Any suitable suspension means may be employed, such as is illustrated in U.S. Pat. No. 3,108,755.

The hopper 12 typically comprises a neck 22 and an enlarged section 24 in which the comminutor 14 resides. The comminutor 14 may be of any suitable design, such as is illustrated in U.S. Pat. No. 3,112,077.

During the grinding operation, water flows into the hopper 12, past the comminutor 14 and into a relatively large sump 26 provided by a stator housing 28 of the motor assembly 16. A sewer connection (not shown) is made to an outlet 30 from the sump 26 to carry off water-entrained food waste that has passed through the comminutor 14. The upper end of the housing 28 is connected in any suitable fashion to the lower end of the hopper 12, as by the use of a split clamping band 32 which encircles the upper end of the housing 28 and has a horizontal projection 34 overlying an outwardly directed flange 36 provided by the bottom of the hopper 12.

The motor assembly 16 comprises as major components the stator housing 28, a rotor 38, upper and lower rotor bearings 40, 42 respectively, an overload switch 44 and mounting 46 therefor, wiring 48 for various purposes and a cover 50 for enclosing the lower housing end.

Figure 2:
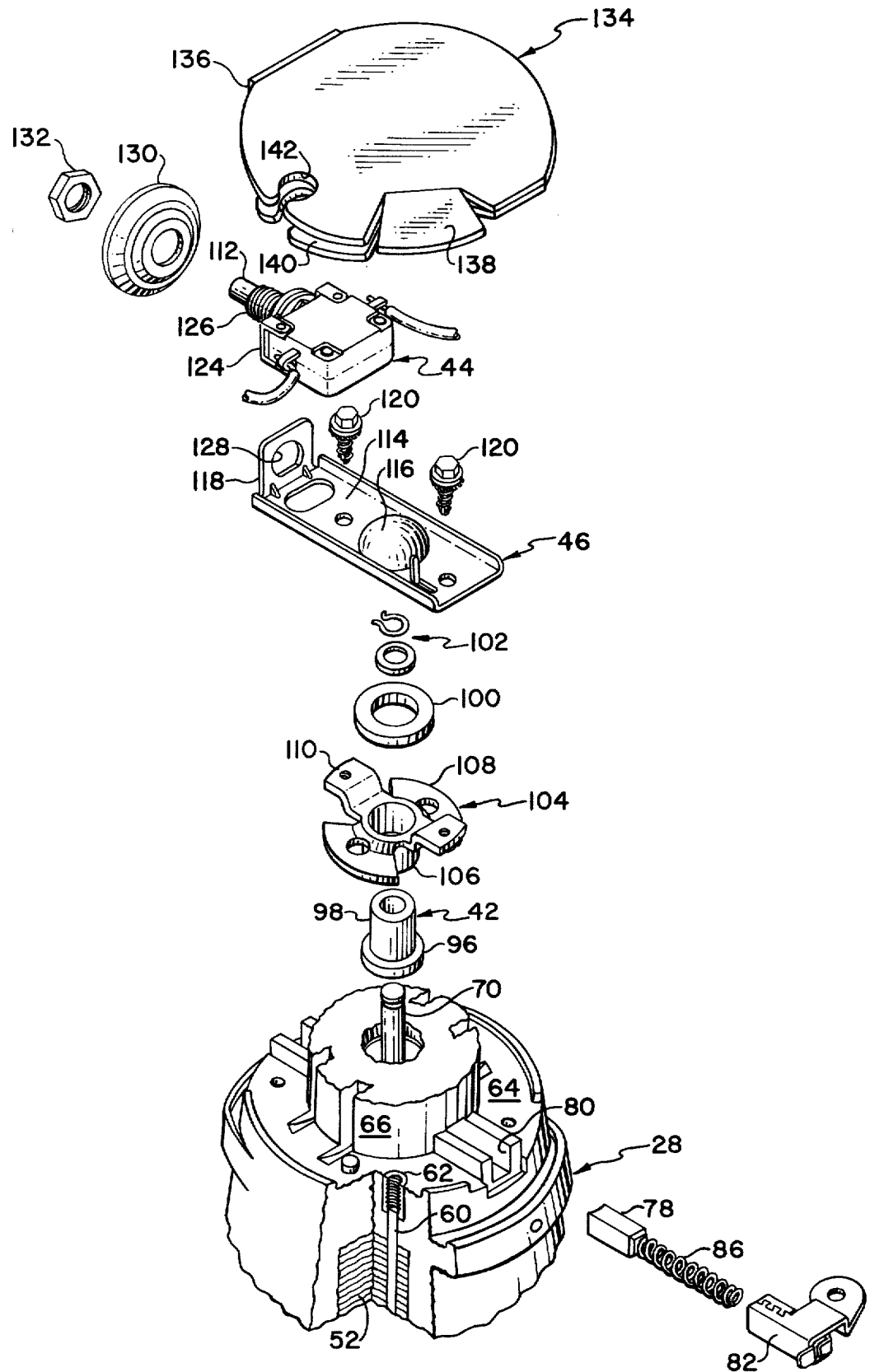
FIG. 2 is a broken exploded view of the lower housing end, the cover being omitted for purposes of clarity.

The stator housing 28 has cast therein a stator 52 of any suitable design. The housing 28 is conveniently made of a filled thermosetting resin, such as an epoxy or a polyester, and includes a generally frustoconical upper wall 54 providing the sump 26 and the outlet 30. A circular shoulder 56 is provided inside the housing 28 defining a vertically extending passage 58 for receiving the rotor 38. Cast into the housing 28 are a plurality of electrically conductive members 60 terminating in female connectors 62 exposed on an exterior shoulder 64 of the housing 28 (FIG. 2). As will be explained more fully hereinafter, the connectors 62 are utilized to complete an electrical circuit to the rotor 38 and stator 52. Projecting from the shoulder 64 is a central boss 66. As shown in FIG. 1, the passage 58 extends into the boss 66 and forms a trough 68 therein for purposes more fully explained hereinafter.

The rotor 38 may be of any suitable design and includes a vertical shaft 70 having the upper end thereof secured to the comminutor 14. The shaft 70 passes through the upper bearing 40 which is secured by suitable screws 72 to the housing shoulder 56 or to threaded embedments therein. A suitable seal guard 74 may be provided to minimize impact damage to the bearing 40.

Rigid with a lower portion of the shaft 70 is a commutator 76 cooperating with a pair of diametrically opposed carbon brushes 78 extending through suitable openings 80 in the housing 28. Each brush 78 is mounted for reciprocable movement in a housing 82 secured to the housing shoulder 64 by a fastener 84.

Each brush 78 is biased toward engagement with the commutator 76 by a spring 86.

Disposed on the shaft 70 below the commutator 76 is a ground shield 88 which acts to assure that carbon dust abraded off the brushes 78 falls into the trough 68 rather than passing into the bearing 42. An arcuate washer 90, around the shaft 70, acts to minimize end play in the rotor 38.

The lower bearing 42 is captivated in a vertical housing passage 92 with the upper bearing end disposed below the top of a generally circular shoulder 94 thereby providing a small lubricant overflow sump. The bearing 42 is made of sintered bronze or other suitable lubricant holding material and comprises a flange 96 closely fitting the passage 92 and a main bearing section 98 of reduced diameter. A lubricant source is preferably provided for the bearing 42. To this end, a lubricant saturated fibrous washer 100 surrounds and engages the main bearing portion 98. The lower end of the shaft 70 is captivated in the bearing 42 in any suitable fashion, as by the use of a retainer and washer assembly 102.

Constraining the bearing 42 against downward movement in the passage 92 is a bearing insert 104 conveniently embedded in the housing 28 as shown in FIG. 1. The insert 104 is conveniently stamped from a relatively soft metallic blank and includes a central tubular section 106 and two pairs of wings 108, 110. The tubular section 106 closely receives the main bearing section 98 and abuts the bearing flange 96 thereby preventing downward movement of the bearing 42. The first pair of wings 108 is deeply embedded in the housing 28 for securing the insert 104 thereto. The second pair of wings 110 is adjacent the lower surface of the boss 66 and includes threaded openings therein for purposes more fully explained hereinafter. It should be noted that the end of the boss 66 is broken away in FIG. 2 to reveal the bearing insert 104. It will be seen that the bearing insert 104 makes thermal and electrical contact with the bearing 42 for purposes more fully explained hereinafter.

The overload switch 44 may be a conventional thermal responsive switch for severing the electrical circuit leading to the motor assembly 16 in response to either increasing bearing temperature or significant increase of current to the motor. The switch 44 is normally closed until the sensed temperature increases above a predetermined point or the current level increases to a predetermined point, or both, whereupon the switch 44 opens. The switch 44 remains open until recycled or reset by a reset button 112 which acts to close the switch 44.

In commercially available disposers of the type previously mentioned, the reset button protrudes through the side wall of the disposer cover. The orientation of a disposer under a conventional sink normally directs the reset button to the side closely adjacent a vertical compartment wall. The gap between the vertical compartment wall and the disposer comprises a handy area to store paper sacks or the like. The placement of a number of paper sacks in this area may press against the reset button such that it may be inadvertently held to the switch closed position. In this event, the thermally responsive switch 44 is able to trip properly but the disposer motor will begin cycling on and off, thereby creating a safety hazard. Recessing the button 112 within the cover 50 inherently avoids this hazard as will be apparent. Recessing the button 112 within the cover 50 also provides an assembly advantage as will be pointed out more fully hereinafter.

In order to provide a convenient connection for the switch 44 and to provide a reliable and predictable heat conductive path theretoward, the mounting 46 is provided. The mounting 46 comprises a metallic generally L-shaped member including a major section 114 having a generally hemispherical cup 116 thereon and a minor portion 118. The major portion 114 is secured to the bearing insert 104 by screws 120 passing through the threaded openings in the second pair of wings 110. As seen in FIG. 1, the cup 116 underlies the lower rotor bearing 42 for receiving lubricant drippage. Accordingly, the disposer components beneath the bearing 42 remain relatively clean and gross lubricant loss is prevented. It will be appreciated that the cup 116 acts as a sump for receiving lubricant until the lubricant level rises into contact with the lower end of the shaft 70. Wick material 121 serves as a means of retaining lubricant for reabsorption by the bearing 42.

The switch 44 comprises a mounting bracket 124 having a threaded section 126 thereon which extends through an opening 128 in the minor portion 118 of the mounting 46. A shield 130 and nut 132 are passed over the threaded section 126 thereby captivating the switch 44 to the mounting 46.

As mentioned previously, one object of this invention is to provide a reliable and predictable heat conductive path from the bearing 142 toward the switch 44. It is evident that the relatively soft metallic bearing insert 104 provides a direct heat conductive path between the bearing 42 and the screws 120. The screws 120 and metallic mounting 46 provide a direct heat conductive path from the insert 104 to the switch mounting bracket 124. The mounting bracket 124, in conventional switches, is insulated from the bimetal switch element to avoid an electrical hazard. Thus, the bimetal switch element is not normally in a direct heat conductive path with the lower rotor bearing 42. The mounting 46 and the bracket 124 will, however, assume an elevated temperature which is proportional to the temperature of the lower rotor bearing 42. Since the mounting 46 is connected to the switch 44 in close proximity, heat transfer therebetween is enhanced to assure reliable and predictable operation of the switch 44. Since the heat transfer mechanism between the bearing 42 and the switch 44 is primarily conduction, rather than convection, opening of the thermally responsive switch 44 is more reliable and predictable.

Positioned beneath the switch 44 is a wiring barrier 134 made of cardboard, heavy paper or the like. The wiring barrier 134 is stamped from a suitable blank and comprises an ear 136 which is captivated by the shield 130. The barrier 134 also includes a second ear 138 for partially closing the opening through the cover 50. The barrier 134 provides a reverted portion 140 for increasing thermal insulation between the relatively hot mounting 46 and the wiring beneath the barrier 134. An opening 142 is provided through the barrier 134 which intersects the periphery thereof to allow the various electrical wires to pass the barrier 134.

The cover 50 comprises a generally frustoconical section closely received by the stator housing 28. Suitable fastening elements 144 provide a secure connection between the cover 50 and the housing 28. The cover 50 provides an opening 146 adjacent the reset button 112 providing access thereto. The bottom of the cover 50 provides an inspection opening 148 normally covered by an inspection plate 150 with a suitable fastener 152 providing a releasable connection. The cover 50 also provides a first terminal 154 for an internal ground connection and a second terminal 156 for connection to a wire leading to an external ground.

Grounding the bearing insert 104 to the terminal 154 is an internal ground wire 158. It will be evident that the screw fastener 120 is in electrical contact with the bearing insert 104 which is in turn in electrical contact with the bearing 42. Thus, the bearing 42 is grounded to the terminal 154. Since the cover 50 is preferably metallic, there is provided an electrical path between the terminals 154, 156. It will accordingly be seen that connecting the terminal 156 to a suitable external ground will provide the desired grounding connection for the shaft 70 and hence the comminutor 14. Since the bearing insert 104 is of relatively soft metal, stamping the same does not create work hardened areas which deleteriously affect the electrical conductivity thereof.

Figure 3:
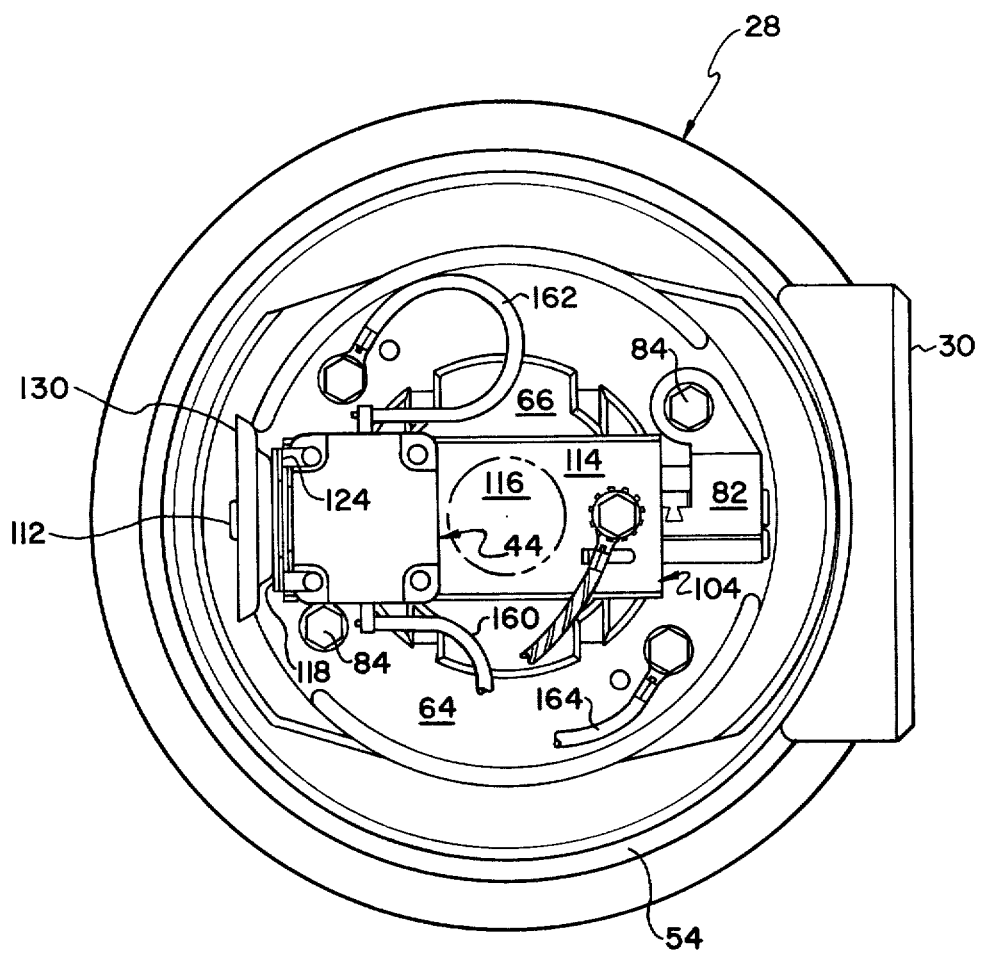
FIG. 3 is a bottom view of the disposer, certain parts being removed for clarity of illustration.

Referring to FIGS. 1 and 3, the wiring 48 includes a hot wire 160 connected to one terminal of the switch 44 and a lead 162 connecting the other terminal of the switch 44 to one of the female connectors 62. The lead 162 is thereby electrically connected to a first stator winding which is electrically connected to the brush housing fastener 84 on the right of FIG. 3. The brush within the housing 82 on the right of FIG. 3 makes electrical connection with the commutator 76. The commutator 76 creates an electrical path through the rotor 38 which exits through the other brush which is hidden by the switch 44 in FIG. 3. This brush is connected by the fastener 84 on the left of FIG. 3 to another of the female connectors 62 to the second stator winding. A return wire 164 is connected to the second stator winding and provides a return wire.

As suggested previously, an important advantage of this invention resides in the ease of assembly thereof. It will be apparent, particularly from FIG. 2, that the mounting 46 and the switch 44 may be secured to the bottom of the stator housing 28 prior to assembly of the cover 50. Similarly, it will be apparent that the connections for the hot wire 160, the lead 162 and the return wire 164 may be made prior to assembly of the cover 50. The wiring barrier 134 is, of course, captivated to the switch 44 and the wires 158, 160, 164 passed therethrough prior to assembly of the cover 50. It will accordingly be apparent that only two minor assembly steps are required after the cover 50 is connected to the housing 28.

The cover 50 is assembled with the inspection plate 150 removed to allow connecting the ground wire 158 to the terminal 154. The wires 160, 164 are passed through an opening 166 in the cover 50 to place the disposer 10 in condition for installation.

What is claimed is:

1. An electrically energized food waste disposer comprising an electrically non-conductive stator housing; a vertical rotor bearing carried by the housing and exposed on the lower housing end; a thermally and electrically conductive member affixed to the housing in thermal and electrical contact with the bearing, said conductive member including an imperforate section enclosing the bearing end; a lubricate source adjacent the lower bearing end; a switch carried by the member in heat exchanging relation thereto for de-energizing the disposer in response to a detrimental change in operating condition of said bearing; a cover affixed to the housing for enclosing the switch and member and including an electrical terminal; and means grounding the member to the terminal.

2. The disposer of claim 1 wherein the switch is thermally and electrically responsive.

3. The disposer of claim 1 wherein the imperforate member section provides a cup below the lubricant source and bearing for receiving lubricant leakage.

4. The disposer of claim 1 wherein the stator housing comprises a matrix of electrically non-conductive material having embedded therein an electrically and thermally conductive insert in engagement with the lower rotor bearing, the member being in thermal and electrical contact with the insert.

5. The disposer of claim 4 comprising threaded fasteners securing the member to the insert, the threaded fasteners providing a thermal and electrical contact between the member and the insert.

6. The disposer of claim 5 wherein the grounding means comprises a wire connected to one of the fasteners and to the terminal.

7. The disposer of claim 1 wherein the switch is normally closed and includes means placing and maintaining the switch in a switch open position in response to increasing bearing temperature and/or current and a reset button for manipulating the switch from the open position to the normally closed position, the reset button residing within the confines of the cover, the cover having an opening adjacent the button providing access thereto.

* * * * *